H. B. YOUNG & R. PALOMINO.
TIRE REMOVER.
APPLICATION FILED DEC. 7, 1909.
964,358.
Patented July 12, 1910.
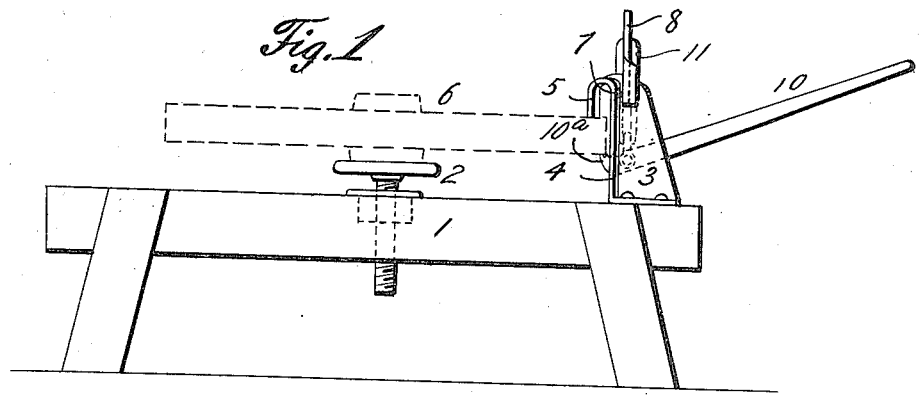
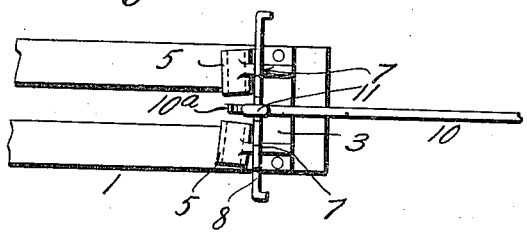
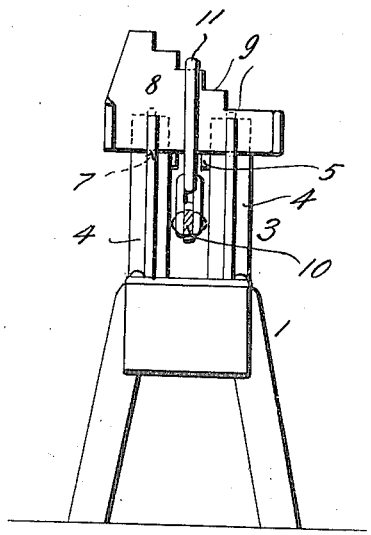
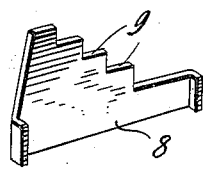
Witnesses
E. Larsan
G. O. Rose.
Inventors
H. B. Young and
R. Palomino,
By Beeler & Robb
Attorneys

UNITED STATES PATENT OFFICE.

HARRY B. YOUNG AND REFUGIO PALOMINO, OF SHAFTER, TEXAS.

TIRE-REMOVER.

964,358.    Specification of Letters Patent.    Patented July 12, 1910.

Application filed December 7, 1909. Serial No. 531,863.

*To all whom it may concern:*

Be it known that we, HARRY B. YOUNG and REFUGIO PALOMINO, citizens of the United States, residing at Shafter, in the county of Presidio and State of Texas, have invented certain new and useful Improvements in Tire-Removers, of which the following is a specification.

This invention relates to improvements in the construction of tire removers described in our application for patent filed May 26, 1909, Serial Number 498,480. Generally speaking the operation of our present invention is substantially identical with that set forth in the above mentioned application, certain improvements, however, having been made by us, and which improvements are fully set forth hereinafter.

For a full understanding of the invention, reference is to be had to the following detail description and to the accompanying drawings, in which—

Figure 1 is a side elevation of a machine showing the improvements comprising this invention, a wheel being shown in dotted lines in position on the machine preparatory to the operation of removing its tire; Fig. 2 is a top plan view of an end portion of the machine and on which the tire removing devices are mounted; Fig. 3 is an end view of the machine; Fig. 4 is a detail view of the supporting plate having the stepped bearings coacting with the tire removing lever.

Throughout the following detail description and on the several figures of the drawings similar parts are referred to by like reference characters.

Referring to the drawings the numeral 1 denotes a suitable stand on which is carried a wheel support 2, and at one end of which is arranged the base 3 from which upwardly project a pair of standards 4. The above parts are substantially the same as those shown in the previous application, along with certain other parts which will not be specifically described herein.

The upper ends of the standards 4 are bent inwardly and downwardly to form arms 5 affording a rigid bearing for the felly or rim of the wheel 6 illustrated in dotted lines. The upper portions of the standards 4 are provided with vertical slots 7 arranged in transverse alinement and adapted to receive therein a supporting plate 8 having the stepped bearings 9. The plate 8 is of a sufficient length to permit of sliding the same transversely on the standards 4 whereby to bring any desired one of the stepped bearings 9 above the space between the standards, and in which space operates the tire removing lever 10. The lever 10 is pivoted between its ends to a suspending link 11 and one end of the lever is formed with a jaw 10ª adapted to directly engage the tire of the wheel in the tire removing operation. The opposite ends of the supporting plate 8 are formed with lateral flanges which limit the sliding movement of the hanger on the standards 4, in an obvious manner, preventing accidental displacement of said hanger.

In the operation of the invention the lever being suspended at its pivoted end from the hanger 8, the wheel is arranged upon the support 2 so that its felly is beneath the arms 5 which are spaced from the standards. By engaging the jaw 10ª of the lever 10 with the tire of the wheel and forcing the outer end of the lever downwardly the tire is gradually removed from the wheel while the latter is rotated on said support 2.

Having thus described the invention, what is claimed as new is:

1. In a tire removing device, the combination of a stand, wheel supporting means thereon, spaced standards, a supporting plate having stepped bearings and mounted for transverse sliding movement on the standards, said standards being provided with means preventing displacement of the supporting plate, and a tire removing lever pivotally connected with the supporting plate and adjustable with reference to its stepped bearings.

2. A tire removing device comprising a stand, a wheel support thereon, a pair of spaced standards having slots in their upper ends, a supporting plate having stepped bearings and slidable transversely with respect to the standards in the slots thereof, each of the stepped bearings of the supporting plate being adapted to assume a position above the space between the standards, and a tire removing lever operable between the standards and pivotally connected with the supporting plate.

3. A tire removing device comprising a stand, a wheel support thereon, a pair of spaced standards having slots in their upper ends, a supporting plate having stepped bearings and slidable transversely with respect to the standards in the slots thereof, each of the stepped bearings of the supporting plate being adapted to assume a position above the space between the standards, the supporting plate comprising a plate, the ends of which are formed with lateral flanges limiting its sliding movement on the standards, a link engageable with the stepped bearings of the supporting plate, and a tire removing lever suspended from said link and operable between the standards.

In testimony whereof we affix our signatures in presence of two witnesses.

HARRY B. YOUNG.
REFUGIO $\underset{\text{mark}}{\overset{\text{his}}{\times}}$ PALOMINO.

Witnesses:
AGUSTIN RAMOS,
A. JOHNS.